United States Patent [19]

Sheffer

[11] Patent Number: 5,027,383
[45] Date of Patent: Jun. 25, 1991

[54] SUPERVISED, INTERACTIVE ALARM REPORTING SYSTEM

[75] Inventor: Eliezer A. Sheffer, Long Island, N.Y.

[73] Assignee: VerSuS Technology, Inc., Trenton, N.J.

[21] Appl. No.: 312,670

[22] Filed: Feb. 17, 1989

Related U.S. Application Data

[63] Continuation-in-part of Ser. No. 62,174, Jun. 12, 1987, Pat. No. 4,868,859.

[51] Int. Cl.$^5$ ............................................. H04M 11/04
[52] U.S. Cl. ........................................ 379/39; 379/59
[58] Field of Search ................. 379/32, 33, 37–40, 379/42–44, 46–51, 59, 60

[56] References Cited

U.S. PATENT DOCUMENTS

| | | |
|---|---|---|
| 3,914,692 | 10/1975 | Seaborn, Jr. . |
| 4,442,320 | 4/1984 | James et al. ............................ 379/42 |
| 4,523,184 | 6/1985 | Abel . |
| 4,652,859 | 3/1987 | Van Wienen .................... 379/40 X |
| 4,731,810 | 3/1988 | Watkins ................................ 379/33 |
| 4,825,457 | 4/1989 | Lebowitz ............................. 379/40 |
| 4,868,859 | 9/1989 | Sheffer ................................. 379/39 |
| 4,887,290 | 12/1989 | Dop et al. ............................. 379/33 |
| 4,718,0979 | 1/1988 | Rabito ............................... 379/39 X |

OTHER PUBLICATIONS

*Security*, vol. 24, No. 5, May 1987, p. 18, "Cellular Communications Goes Off-Road to Transmit Alarms".
*Security Distribution and Marketing*, Apr. 1989, p. 80, "Cellular Carries Alarm Signals".

*Primary Examiner*—Jin F. Ng
*Assistant Examiner*—Wing F. Chan
*Attorney, Agent, or Firm*—Weiser & Stapler

[57] ABSTRACT

An alarm reporting system includes a control unit which services a supervised derived channel communicator, and a one-way radio communicator (preferably via the cellular telephone network), to provide for interactive operation of the derived channel unit and the radio transmitter according to alarm conditions which may arise at the premises, and the existing condition of the equipment comprising the system. The system is capable of communicating with a central monitoring facility, or mobile units (patrol vehicles or service vehicles) associated with the central monitoring facility, for enhanced security of the monitored premises.

47 Claims, 5 Drawing Sheets

SUPERVISED, INTERACTIVE ALARM REPORTING SYSTEM

RELATED CASE

This is a continuation-in-part of prior co-pending U.S. patent application Ser. No. 062,174, filed June 12, 1987 and entitled "Supervised, Interactive Alarm Reporting System", now U.S. Pat. No. 4,868,859 the subject matter of which is incorporated by reference as if fully set forth herein.

BACKGROUND OF THE INVENTION

The present invention relates generally to remote alarm reporting systems, and in particular, to a supervised alarm reporting system which is capable of providing enhanced security.

A variety of security systems have been developed to satisfy the ever-increasing need for the remote monitoring of various premises, including both business and home applications. Generally, this is accomplished by providing the premises with a local terminal, or reporting unit, which is capable of receiving signals from various sensors placed throughout the premises, interpreting such signals, and interacting with a central office or station to advise the central facility of potential alarm conditions. The sensors communicating with the local terminal may be used to provide any of a variety of functions, including smoke and fire detection, the detection of intruders (i.e., possible break-ins), or to monitor local conditions such as temperature, pressure or other desired parameters. The corresponding central facility might constitute any of a number of private companies which have been established for security or other monitoring purposes. The key to the effectiveness and integrity of the system provided often depends upon the means which are used to establish communications between the local terminal provided at the premises and the monitoring equipment provided at the central facility. A number of systems have therefore been devised to provide such communications.

Perhaps the most common means of communication between the local terminal and the central facility is the switched network telephone lines which connect these two locations. The local terminal provided at the remote premises is connected to the switched telephone line network associated with the premises, to establish remote communications. Often, such communications are initiated by the local terminal, which automatically dials the central facility when a potential alarm event has been detected (one-way communications). While such communications may be accomplished by voice (a recorded message), the current trend is for such communications to be accomplished through digital communicators, which are capable of providing more detailed information regarding the potential alarm condition. Communications via the switched telephone line network are popular because they are inexpensive, well proven and reliable. Moreover, the switched telephone line network is already in place, readily accessible, and serviced by a third party. A cost effective security system results.

However, such systems provide only limited security because of the free accessibility of others to the switched network telephone lines. The lines are not secured, and may be cut either accidentally, or intentionally, severing the link between the local terminal and the central facility. In fact, periodic interruptions are generally necessitated by the testing requirements which are imposed by the utilities that install and service such telephone lines. Since in the case of one-way communications the central facility has no way of knowing whether or not the communicating lines are operational, it is possible for alarm conditions signaled by the local terminal to go undetected if the telephone line is defective.

For this and other reasons, efforts were made to develop supervised communicating systems adaptable for use in connection with switched network telephone lines (two-way communications). Due to their manner of operation, such systems are capable of providing an indication as to the condition of the communicating telephone lines, as well as the local terminal. An example of such a system may be found with reference to U.S. Pat. No. 4,442,320, which describes the "Subscriber Terminal Unit" alarm reporting system of BT Telecom, Inc. Such alarm reporting systems, which are generally known as derived channel systems, modify the above described one-way system by providing means which allow the central facility to verify the integrity of the system, and the communicating telephone lines. In connection with the "Subscriber Terminal Unit" alarm reporting system, this is accomplished in two ways. First, the central facility is permitted to periodically interrogate the local terminal at the remote premises, to determine its status. In addition to indicating whether or not there are any alarm conditions, this also has the benefit of verifying that the communicating lines are intact. Second, there is additionally provided a tone, having a frequency below the audible range, which is transmitted by the local terminal at specified times. Again, in addition to the reporting function of this tone, this additionally provides a means for verifying the integrity of the communicating telephone lines.

Such derived channel systems therefore have the advantage of indicating whether or not the system is operational, and is properly reporting its condition. This avoids the potential "blackouts" inherent in one-way communicating systems, thereby serving to significantly enhance security.

However, this supervisory capability has been found to cause yet another difficulty. When, for whatever reason, the local terminal ceases to report its condition, the associated central facility is constrained to declare a break-in since it is not sure whether the cessation of operations results from an equipment failure, a test of the telephone lines by the local utility, or an actual break-in. This necessarily results in a significant number of false alarms, since equipment failures are inevitable, and since the utilities must periodically test their equipment. Such false alarms have led to a certain amount of apathy on the part of the police, and have even caused some police departments to limit the number of responses which they will make to calls received regarding a given premises.

Yet another system which is commonly used is the direct wire system. In this system, communications (either one-way or two-way) are established by a private (shared or dedicated) line running directly between the local terminal and the central monitoring facility. Since this system is no longer dependent upon the switched telephone line network, a greater degree of predictability is provided. In particular, there is no longer a need to account for third party testing of the communicating system. However, there is still presented the potential for interrupted communications to be the result of either an equipment failure, an accidental cutting of the line, or an actual break-in, again leading to the above-described problems. The central facility must again take action based upon assumed information, declaring a break-in when in fact there might be none. Moreover, any increases in security which are provided by such a system are counterbalanced by significant increases in cost, since the communicating lines of the system require special installation as well as dedicated service and maintenance.

Yet another system involves the replacement of wired lines with radio communications. While it is significantly more difficult to "cut" radio communications between the local terminal and the central facility, such jamming techniques do exist. Consequently, a one-way radio system, although more reliable than a wired one-way system, will still suffer from the disadvantage that the central facility is not made aware of whether or not the system is in operation. A two-way radio system would enable a supervisory function to be added. However, this requires continuous two-way communications by way of radio. Such systems are therefore subject to significant radio frequency capacity limitations in view of the regulatory constraints which are in place regarding the use of radio waves, and in terms of the number of frequencies which are available for use in a particular system (limiting the number of possible installations). Yet another factor to consider is the significant cost of installation and maintenance which such a system necessarily entails.

Moreover, a consideration which is common to each of the above-described systems is that, irrespective of the elegance of the system, discontinued signals from the local terminal cannot be interpreted. This generally necessitates the declaration of a break-in when in fact there may be none. Once the line of communications (wired or radio) has been cut, it is not possible for the central facility to determine the exact nature of the problem. Because of this, a significant potential exists for police to be dispatched to a particular premises for no reason. Still further complicating matters is that in connection with systems which are capable of reporting more than one type of alarm condition, it is possible for the wrong remedy to be dispatched to the premises, since the exact nature of the alarm cannot be determined. For example, the police may be dispatched to a premises when in fact the discontinued signals result from a fire, a medical emergency, or a needed repair. It is clearly unreasonable to dispatch all such remedies to a given premises every time communications with a particular premises cease.

For this reason, efforts have been made to develop dual technology systems which combine two of the above-described systems in a single unit. Generally, this is accomplished by combining a wired system and a radio system. If either unit ceases to operate, the remaining unit operates to convey information to the central facility. However, unless the wired system and the radio system are supervised, the potential still exists for many of the above described problems to arise. Ultimately, this can be remedied by providing a supervised wired system and a supervised radio system. However, while providing significant security, such a system is prohibitively expensive, and still suffers from the significant limitations imposed by the need for constant two-way radio communications.

SUMMARY OF THE INVENTION

It is therefore the primary object of the present invention to provide a supervised, interactive alarm reporting system which is capable of providing a high degree of security without suffering from the significant drawbacks of previously available systems.

It is also an object of the present invention to provide a supervised, interactive alarm reporting system which is capable of indicating the exact nature of a signaled event, even after significant failure of or tampering with the system.

It is also an object of the present invention to provide a supervised, interactive alarm reporting system which is not significantly limited in terms of the number of subscribers which may be connected to the system, as a result of technical or regulatory constraints.

It is also an object of the present invention to provide a supervised, interactive alarm reporting system having the foregoing capabilities, yet which is inexpensive to install, maintain and service.

It is also an object of the present invention to provide a supervised, interactive alarm reporting system which is capable of being adapted to and/or added to existing alarm reporting systems, to the extent possible.

These and other objects are achieved in accordance with the present invention by providing an alarm reporting system having a control unit which services a supervised derived channel communicator, and a one-way radio communicator, to provide for interactive operation of the derived channel unit and the radio transmitter according to the alarm conditions which may arise at the premises, and the existing condition of the equipment comprising the system.

Normally (with both units operational), the supervised derived channel unit operates to advise the associated central station of the conditions at the monitored premises. In the event of a failure of the derived channel unit, the radio transmitter is activated to advise the central station of the current status of the system. This alerts the central station to the failure, and also indicates the existing condition of the premises. If the premises are in proper condition (i.e., no alarm conditions reported), an equipment failure is indicated and steps are taken to repair the fault in due course. If there is an alarm condition at the premises, the central station will be advised of this by the radio transmitter, allowing appropriate measures to be taken. In the event that both units cease to operate, the central station is made aware of the simultaneous failure since the supervised, derived channel unit will cease to operate and the radio transmitter will not follow this cessation of activity with an appropriate report. This will result in a declared break-in. However, since the probability against both units failing simultaneously is extremely high, a declared break-in is justified.

Further in accordance with the present invention, the one-way radio communications which are used are preferably accomplished by means of the cellular telephone network. This not only provides the above-discussed operational functions, but also makes use of an existing network which is installed and serviced by third parties. Since actual use of the cellular telephone network is kept to a minimum as a result of the manner of operation of the system, the marginal costs of using the cellular telephone network are kept to a minimum. Moreover, use of the cellular telephone network has the added advantage of permitting simultaneous communications with both the central station which is monitoring the premises, as well as mobile units associated with the central station. Such mobile units may include mobile patrol vehicles, or mobile service vehicles, which can share in the responsibility of servicing a significant number of installations.

This results in an alarm system which is capable of providing a large number of subscribers with significant security, together with reduced response times, yet which can be installed at a minimal cost, and which is readily adaptable to existing alarm systems, including both derived channel and direct wired systems. Further detail regarding the construction of a supervised, interactive alarm reporting system in accordance with the present invention may be had with reference to the detailed description which is provided below, taken in conjunction with the following illustrations.

BRIEF DESCRIPTION OF THE DRAWINGS

In the several views provided, like reference numerals denote similar structure.

DETAILED DESCRIPTION OF THE PREFERRED EMBODIMENT

Figure 1:
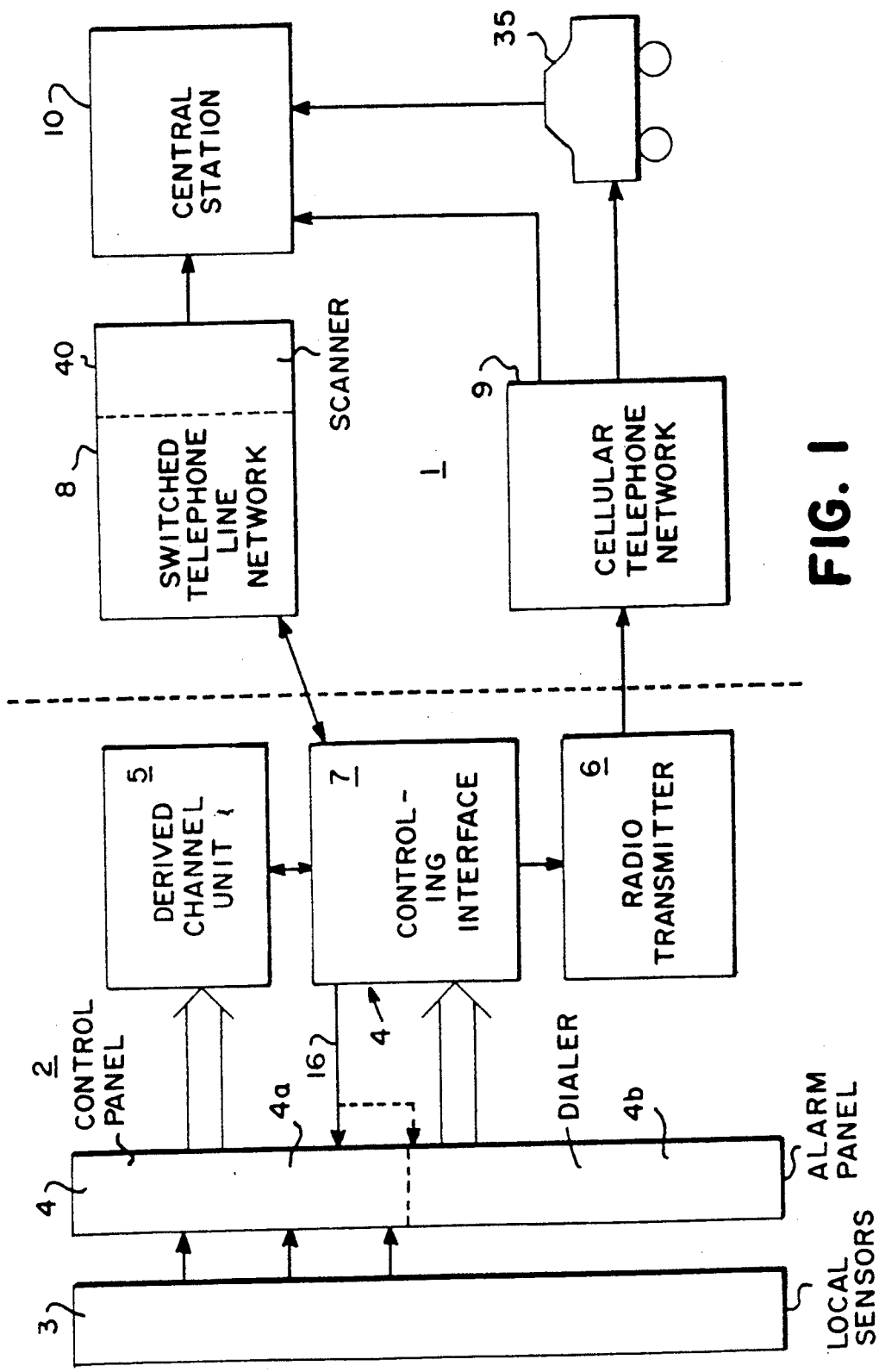
FIG. 1 is a schematic representation of the supervised, interactive alarm reporting system of the present invention.

FIG. 1 generally illustrates the supervised, interactive alarm reporting system 1 of the present invention. To this end, the premises 2 to be monitored is generally provided with one or more sensors 3 which are capable of providing signals to a local alarm panel 4. Any of a variety of different types of sensors 3 may be used in connection with such a system, including smoke detectors, fire detectors, various detectors for determining intrusions such as contact switches, light sensitive circuits and ultrasonic circuits, as well as any of a number of parameter sensors such as temperature sensors, pressure sensors, timing devices or the like. To be noted in this regard is that only a single sensor may be provided, or any number of plural sensors may be utilized in operative combination. In any event, such sensors would be operatively connected to the local alarm panel 4 for ultimate (serial) processing as will be described more fully below.

The alarm panel 4 conventionally includes a control panel 4a which is configured to communicate with a derived channel unit 5. The derived channel unit 5 operates to communicate with a central station 10 via the switched telephone line network 8 through the intermediary of a controlling interface 7, which will be described more fully below. Any of a variety of derived channel units 5 could be used for this purpose. However, in accordance with the present invention it is preferred that the derived channel unit 5 constitute a "Subscriber Terminal Unit" of the type manufactured by BT Telecom, Inc., Trenton, N.J. This unit is preferred in view of the supervisory capabilities which it provides. These supervisory capabilities are described with reference to U.S. Pat. No. 4,442,320, the subject matter of which is incorporated by reference as if fully set forth herein.

The alarm panel 4 also conventionally includes a dialer 4b (i.e., an automatic telephone dialing device) which is configured to communicate with a radio transmitter 6, again through the intermediary of the controlling interface 7. The radio transmitter 6 operates to communicate with the central station 10 by wireless communications. In accordance with the present invention, it is preferred that the radio transmitter 6 operate to transmit signals via the cellular telephone network 9 for reasons which will become apparent from the description which is provided below.

Under normal operating conditions, it is expected that both the derived channel unit 5 and the radio transmitter 6 will be operational and functioning in their normal mode. In their preferred embodiment, the derived channel unit 5 is preferably a supervised unit, while the radio transmitter 6 is preferably configured as a non-supervised, one-way transmitter. The reason for this is that in the normal course of operations, the cost effective, supervised reporting capabilities of a derived channel unit 5 will be sufficient, and the relatively expensive cost of operating the radio transmitter 6 will be unnecessary. The supervised, derived channel unit 5 will therefore normally operate to keep the central station 10 advised as to the status of the premises 2, in cost effective fashion. Unless a fault is detected (e.g., in the derived channel unit 5 or the switched telephone line network 8), the radio transmitter 6 will essentially remain dormant, keeping the impact (load) on the radio transmission network, in this case preferably the cellular telephone network, to a minimum. In addition to reducing costs, this allows a maximum number of local terminal units to be operatively associated with a particular central station without compromising the capabilities of such wireless communications.

It shall now be assumed that the derived channel unit 5 ceases to report. This may be the result of an equipment failure of the derived channel unit 5, an interruption or break in the switched telephone line network 8 due to servicing, accident or the like, or a potential break-in.

Figure 2:
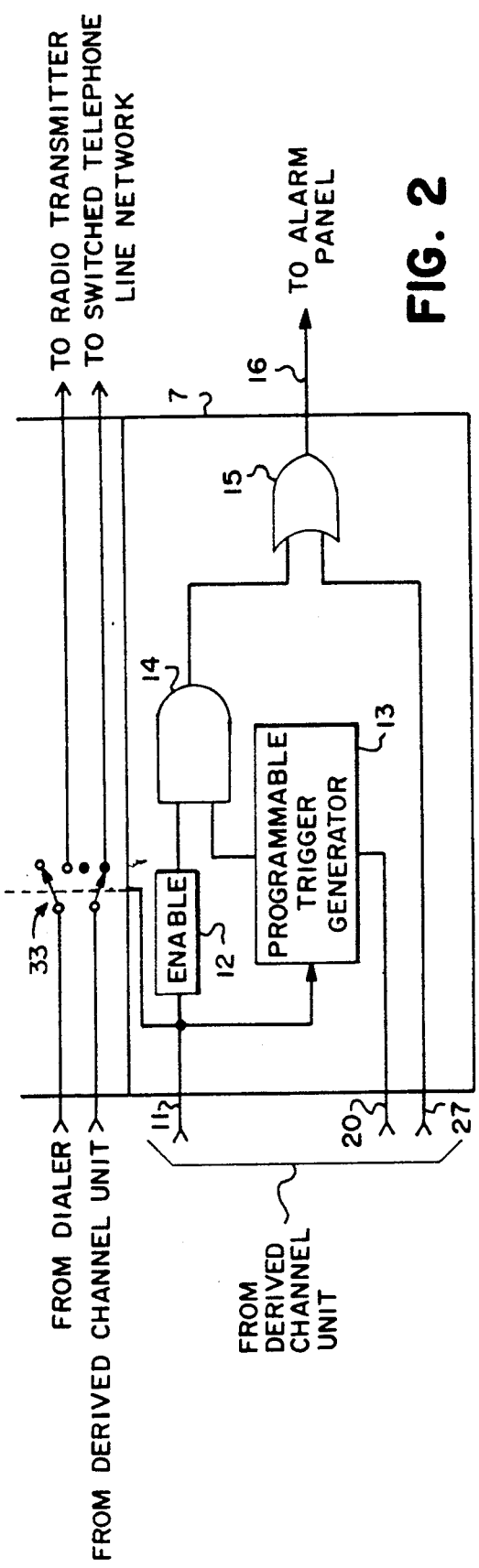
FIG. 2 is a schematic view showing the construction of the controlling interface.

In the event that the cessation of activity is the result of a fault in the switched telephone line network 8, the derived channel unit 5 will be unable to complete its supervisory interrogation sequence. As a result, the internal verification (i.e., line fault monitoring) systems of the derived channel unit 5 (in this case the "Subscriber Terminal Unit" distributed by BT Telecom, Inc. under the Model No. 70473-501) will provide an output indicating the occurrence of a fault. This output may then be used to develop a fault signal, which is applied at 11 in FIG. 2 of the drawings, which is simultaneously applied to a relay 33, the input of an enabling circuit 12, and to the input of a programmable trigger generator 13.

The relay 33 operates to distribute signals between the alarm panel 4 and the central station 10 according to the condition of the system, as previously described. For example, under normal operating conditions the relay 33 operates to connect the derived channel unit 5, which receives its input for the alarm panel 4 (the control panel 4a), with the switched telephone line network 8. When a fault is detected in this primary communicating path, the relay 33 is toggled to disconnect the derived channel unit 5 from the switched telephone line network 8 and to connect the alarm panel 4 (the dialer 4b) with the radio transmitter 6, and accordingly, the cellular telephone network 9.

The enabling circuit 12 and the programmable trigger generator 13 are, in essence, monostable circuits (or software routines) which are capable of developing appropriate pulses responsive to the fault signal 11, as will be described more fully below, which are in turn applied to the first and second inputs of an AND circuit 14. Coincidence between the signals produced by the enabling circuit 12 and the programmable trigger generator 13 will cause an output to be developed at the AND circuit 14, which is then introduced to the first input of an OR circuit 15. This signal will in turn be passed through the OR circuit 15, for output at 16. The output 16 is in turn applied to the alarm panel 4 (through the control panel 4a or dialer 4b, depending upon the particular alarm panel 4 which is employed), which is at that time coupled with the radio transmitter 6.

Activation of the radio transmitter 6 causes (preferably immediately) the status of the premises 2 to be transmitted to the central station 10 via the cellular telephone network 9. Accordingly, the central station 10 is made aware of the fault in the derived channel unit 5, and of the existing status of the sensors 3 associated with the premises 2. With this information, the central station 10 is able to make a decision as to whether or not there is an alarm condition which requires a response, or if there is simply a fault which requires eventual servicing. To be noted is that the radio transmitter 6 at all times remains available to advise the central station 10 of any changes in the status of the local sensors 3 (i.e., alarm events).

As previously indicated, the radio transmitter 6 is preferably a non-supervised, one-way unit. Accordingly, after the initial transmission of information as previously described, the radio transmitter 6 could then be subject to tampering, without the central station 10 becoming aware of such tampering. However, by properly programming the programmable trigger generator 13, this problem can be overcome as follows.

Figure 3:
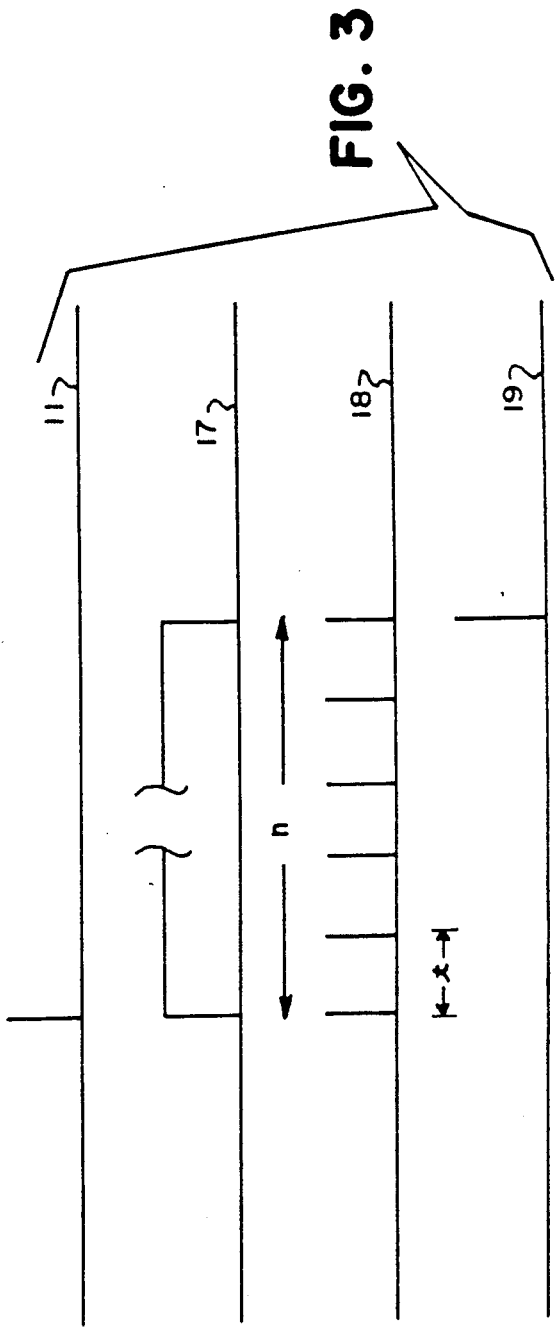
FIG. 3 is a timing diagram illustrating the interactive operation of the foregoing components.

Referring now to FIG. 3 of the drawings, various timing sequences associated with the controlling interface 7 are illustrated. As previously indicated, upon discontinuance of the operation of the derived channel unit 5, the fault signal 11 is produced. Responsive to the fault signal 11, the enabling circuit 12 operates to develop an enabling signal 17 for application to the first input of the AND circuit 14, while the programmable trigger generator 13 operates to develop its own programmed sequence for application to the second input of the AND circuit 14, as follows.

If it is only desired to provide a radio transmission upon the failure of the derived channel unit 5, the output of the programmable trigger generator 13 could be established in accordance with the sequence 11 illustrated in FIG. 3. This would provide an initial indication of the fault, and maintain radio communications, but would not provide any supervisory capabilities. In the event that supervisory capabilities are desired for enhanced security, the output of the programmable trigger generator 13 could be modified to establish the sequence 18 shown in FIG. 3. This would be accomplished by programming the programmable trigger generator 13 with a specified number of pulses (n) and time interval (t) between the pulses which are preferably variable (by the subscriber) to suit the user's specific requirements. Increasing the number of pulses and/or frequency would increase the security provided, with an attendant increase in costs associated with the periodic exercise of the radio transmitter 6. Decreasing the number of pulses and/or frequency would have the opposite effect. Nevertheless, a supervisory function would result as follows.

Assuming that the derived channel unit 5 has failed, the central station 10 will begin to receive communications from the radio transmitter 6. As will be discussed more fully below, the central station 10 is made aware of (programmed to expect) the periodic re-transmissions which are to occur in accordance with the selected sequence developed within the programmable trigger generator 13. The central station 10 will therefore be looking for these periodic transmissions to verify that the radio transmitter 6 has not been tampered with. This will also serve to periodically advise the central station 10 of the status of the premises 2. Failure to receive a scheduled transmission (or if desired, a contiguous pair of transmissions) will signify that the radio transmitter 6 is no longer operational. While this will cause the central station 10 to lose contact with the premises 2, the probability of a simultaneous failure of the derived channel unit 5 and the radio transmitter 6 is sufficiently small for the central station 10 to assume that there is a break-in at the premises 2 which warrants immediate attention. Suitable personnel could then be dispatched.

To be noted is that the periodic transmissions of the programmable trigger generator 13 could be continued for a significant period of time, if desired. Indeed, the periodic transmissions could be maintained indefinitely, provided the enabling signal 17 (which is provided to allow the installer of the system to limit radio supervision) is also correspondingly maintained, until such time as the derived channel unit 5 could be repaired.

Such periodic transmissions are accomplished as a result of the coincidence of the enabling signal 17 and one of the pulses developed by the programmable trigger generator 13, within the AND circuit 14. This provides a signal to the OR circuit 15, which will in turn be passed to the radio transmitter 6 as previously described. Upon correction of the fault within the derived channel unit 5, a restore signal such as is represented by the sequence 19 shown in FIG. 3 is provided to reset the programmable trigger generator 13, at 20 in FIG. 2. Alternatively, this restoration function can be accomplished by resetting the enable circuit 12, if desired. This operates to terminate the output at the AND circuit 14, restoring the controlling interface 7 to its normal operating condition.

Figure 4:
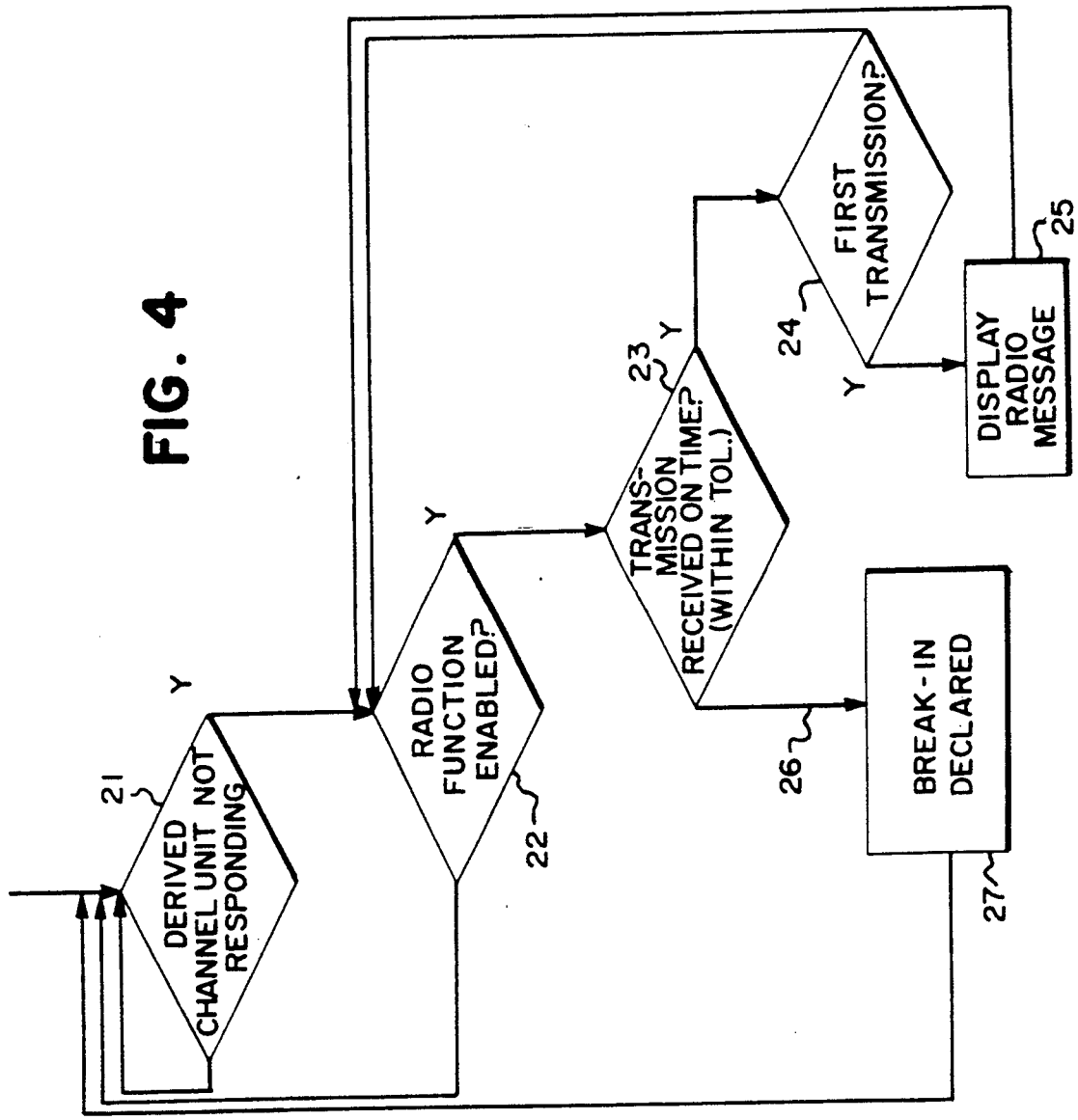
FIG. 4 is a flow diagram illustrating the steps taken at the central station to interpret the signals received from the local terminal unit.

As previously discussed, the foregoing operations must be complemented by operations at the central station 10 which serve to interpret the transmissions of the alarm reporting system 1. FIG. 4 illustrates the nature of these operations. As shown, activity at the central station 10 commences when it is determined that one of the derived channel units 5 is no longer responding, at 21. In such case, the central station 10 would then search for the corresponding radio transmission which is to result from the identified failure of the derived channel unit 5, if the particular subscriber is provided with such a capability, as determined at 22 (some subscribers may only be provided with supervised derived channel units, without the enhancement of a radio backup). Assuming that the subscriber has been provided with (has subscribed to) the alarm reporting system 1 of the present invention, a test is then made at 23 to determine whether or not the anticipated transmission has been received (within a defined tolerance). It will be understood that the timing of this test must therefore be programmed to correspond to the timing of the sequence entered into the programmable trigger generator 13, according to the requirements of the subscriber. Upon receiving the initial radio transmission from the alarm reporting system 1, which is detected at 24, a message 25 is displayed to alert the central station 10 of the failure of the derived channel unit 5 so that appropriate steps may be taken to repair the problem in due course. Subsequently, during a period of time established to correspond with the enabling signal 17, transmissions verifying continued operation of the radio transmitter 6 as previously described are then sought by returning to the test 22, and repeating the foregoing procedures. In the event that anticipated radio transmissions are not received, at 26, a break-in is declared at 27 and appropriate personnel are dispatched to the premises 2.

The foregoing assumes a failure of the derived channel unit 5. However, as previously indicated, the derived channel unit 5 may also cease to report due to an interruption or break in the switched telephone line network 8, or due to tampering in the course of a break-in. The first of these possibilities will result in a non-responding derived channel unit 5, causing further operations to proceed as previously described, until the fault with the communicating line is repaired. During the fault, the radio transmitter 6 will operate to keep the central station 10 advised of the status of the premises 2. Upon repair of the fault, re-established communications with the derived channel unit 5 will reset the controlling interface 7 (e.g., at the reset 20), returning the alarm reporting system 1 to its normal operating condition. The second of these possibilities will cause an alarm condition to occur, which will be transmitted to the central station 10 by the radio transmitter 6, enabling appropriate personnel to be dispatched to the premises 2.

It shall now be assumed that the radio transmitter 6 has failed. In essence, the alarm reporting system 1 need take no further action in such case since the derived channel unit 5 is fully supervised. Thus, the central station 10 remains in continuous contact with the premises 2, and is advised of its status. In the event that the derived channel unit 5 then ceases to operate, the central station 10 will not be able to proceed through the sequence previously described, since the initial radio transmission will not be received at the prescribed time. Again, since the probability of a simultaneous failure of the radio transmitter 6 and the derived channel unit 5 is quite low, a declared break-in is justified, and appropriate personnel are dispatched.

Figure 5:
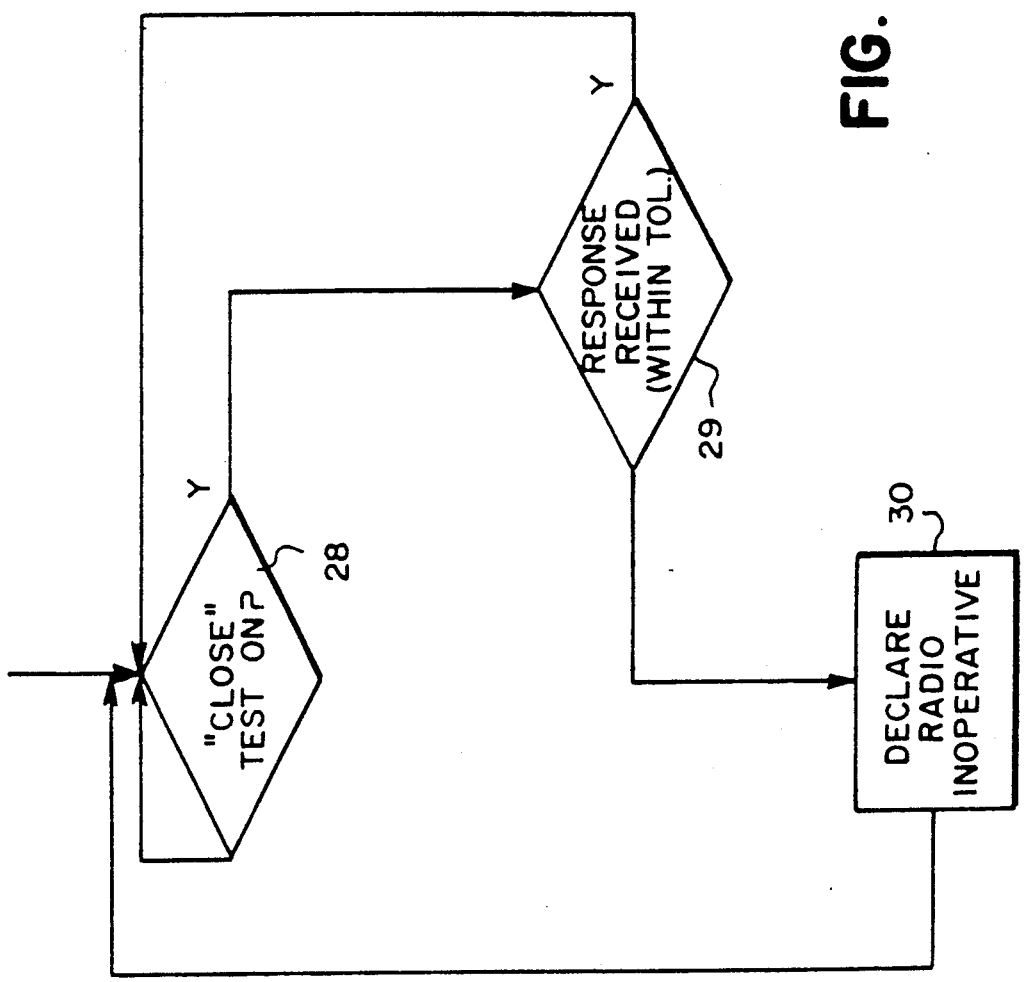
FIG. 5 is a flow diagram illustrating steps which may be taken at the central station to periodically test the integrity of the system.

The reliability, and therefore the predictability of this sequence can be further enhanced if the radio transmitter 6 is periodically tested to verify that it is operational. This may be accomplished by the testing procedure which is described with reference to FIG. 5. As previously indicated, the derived channel unit 5 is supervised, and is therefore periodically tested to verify its integrity. A test which is conventionally provided in connection with the earlier identified "Subscriber Terminal Unit" of BT Telecom, Inc. involves the periodic (usually each 24 hour period) transmission of a "close" signal to the "Subscriber Terminal Unit", which in turn provides an acknowledgment of this signal. This acknowledgment signal is also advantageously applied to the controlling interface 7, at 27, to provide a periodic check of the radio transmitter 6 by coupling the signal provided at 27 through the OR circuit 15 and to the radio transmitter 6. With reference to FIG. 5, this test is initiated at 28, followed by a check to verify receipt of the radio transmission (within a prescribed tolerance), at 29. If so, the test is complete until the next testing period. If not, the radio transmitter 6 is declared inoperative, at 30, and steps are taken to dispatch appropriate personnel to repair the unit. Other available signals may be used, as desired, to perform similar testing of this nature. Also to be noted is that this functionality can be used to test, or exercise the system at desired times (as distinguished from periodically), to permit the central station 10 to determine the present condition of the alarm reporting system 1 should the need arise.

Of course, in the event that both the derived channel unit 5 and the radio transmitter 6 cease to function, a presumption is made that a significant problem exists at the premises 2, and a break-in is immediately declared. Appropriate personnel are then dispatched to the premises 2 to deal with the situation. However, the derived channel unit 5 and the radio transmitter 6 are preferably provided with a battery back-up to account for power failures and the like, so that the probability of a simultaneous equipment failure will be extremely low. This allows the break-in to be declared with a high degree of reliability, avoiding false alarms.

Accordingly, as a result of the foregoing operations the central station 10 is kept fully advised of the status of the premises 2, even during equipment failures. Conditions are maintained which allow the premises to be monitored, even if there has been significant tampering. Due to the redundancy of the system, significant tampering can practically speaking be the only cause of a system failure (other than a failure of one of the sensors 3 or at the central station 10), allowing a break-in to be declared with confidence. To be noted is that this is accomplished with only minimal use of the wireless system, keeping costs to a minimum and avoiding possible overtaxing of the wireless transmission system.

The use of wireless communications as previously described, particularly making use of the cellular telephone network, provides yet another enhancement to security as follows. In accordance with those operations previously described, equipment failures other than those involving the radio transmitter 6 will cause a radio transmission to be made. However, the signal which is transmitted to the central station 10 is also potentially receivable at other places. For this reason, and in accordance with the present invention, the supervised, interactive alarm reporting system 1 of the present invention is preferably further provided with mobile units 35 which are capable of supplementing the above described functions. Faults in equipment encountered at the premises 2 can therefore immediately be conveyed to a mobile unit 35, which is in a position to even more promptly respond to the potential problem. This can even eliminate the need for the central station 10 to get in contact with the personnel which are needed to accomplish the necessary repairs (possibly even eliminating the need for the central station 10 itself), leading to a significant savings in response time. Nevertheless, it is considered advantageous for the mobile units 35 to be in contact with the central station 10, a capability which is again advantageously achieved through the cellular telephone network 9.

Yet another enhancement results in causing the radio transmitter 6 to operate, in parallel with the derived channel unit 5, each time an alarm condition is detected at the premises 2. This serves to immediately advise the mobile units 35 of the detected alarm, allowing an immediate and positive response in the shortest possible time period.

Thus, the mobile units 35 can include service vehicles for correcting faults in the system and/or security vehicles for responding to alarms or declared break-ins. This capability is provided without additionally taxing the cellular telephone network 9 or the remaining components of the alarm reporting system 1. Although voice communications are possible, the foregoing capabilities are advantageously achieved by provided the mobile units 35 with an appropriate computer/transceiver. Such a computer/transceiver may be developed by combining a suitable portable computer with a mobile converter such as is presently marketed by the Motorola Corporation. In either case, the mobile units 35 are immediately advised of the situation at the premises 2, whether to take immediate action in accordance with the received message, or to get in contact with the central station 10 to determine a proper course of action.

It will therefore be seen that the above described supervised, interactive alarm reporting system serves to satisfy each of the objectives previously set forth. Moreover, the described system can be implemented without having to modify the existing alarm reporting system of the premises (i.e., the derived channel unit 5). It will further be understood that the supervised, interactive alarm reporting system of the present invention is capable of being modified without departing from the spirit and scope of the present invention.

Many of these variations have previously been described in connection with the various specific elements of the system. It is further to be understood that any of a variety of available derived channel units 5 or radio transmitters 6 could be used apart from those which have been described as preferred for use in connection with the system 1 of the present invention. One such variation which is particularly noteworthy is an alternative configuration which makes use of two-way radio communications in combination with a digital communicator. This system is effectuated similar to the system previously described, by substituting the two-way radio for the derived channel unit 5, and by substituting the digital communicator for the radio transmitter 6. Operation of the resulting unit, and the resulting benefits, would proceed as previously described.

Yet another variation allows significant security to be provided for mobile sites such as land vehicles, aircraft, and sea vessels. To this end, the mobile site may be provided with a desired security system (theft, fire, etc.), the local terminal of which is then placed in communication with a central station or mobile security units via the cellular telephone network. This allows the mobile site to appropriately report its condition, irrespective of its location, and even while moving.

Yet other enhancements in security are achievable by modifying the derived channel unit which is used in conjunction with the supervised, interactive alarm reporting system of the present invention. The derived channel unit 5 which was previously described generally takes the form of a standard "Subscriber Terminal Unit" of the type distributed by BT Telecom, Inc., which includes as part of its structure a line fault monitor for detecting compromises (e.g., open or short lines) in the switched telephone line network 8. This available functionality is used to cause the alarm reporting system 1 to switch from communications via the switched telephone line network 8 to the radio transmitter 6 (i.e., the fault signal 11 shown in FIG. 2) when this becomes necessary. However, it has been found to be desirable to further modify the derived channel unit 5 to recognize still other faults and potential faults of the system, as follows.

For example, enhanced security is afforded by providing a derived channel unit which can at all times identify cuts, shorts, and attempted substitutions in the switched telephone line network which communicates with the derived channel unit, as well as interruptions in operation of the "scanner" which is used to periodically poll the derived channel unit, such as down periods, so-called scanner "wink" and noisy line conditions, which can at times prevent effective communication between the derived channel unit and the scanner which addresses it. Also of interest is to identify compromises in the signal path which is established between the scanner and the monitoring central station in the event of an alarm condition, to verify that the detected alarm condition has been effectively reported. This is in addition to the desirability of monitoring the internal status of the derived channel unit, particularly its memory and microprocessor.

Figure 6:
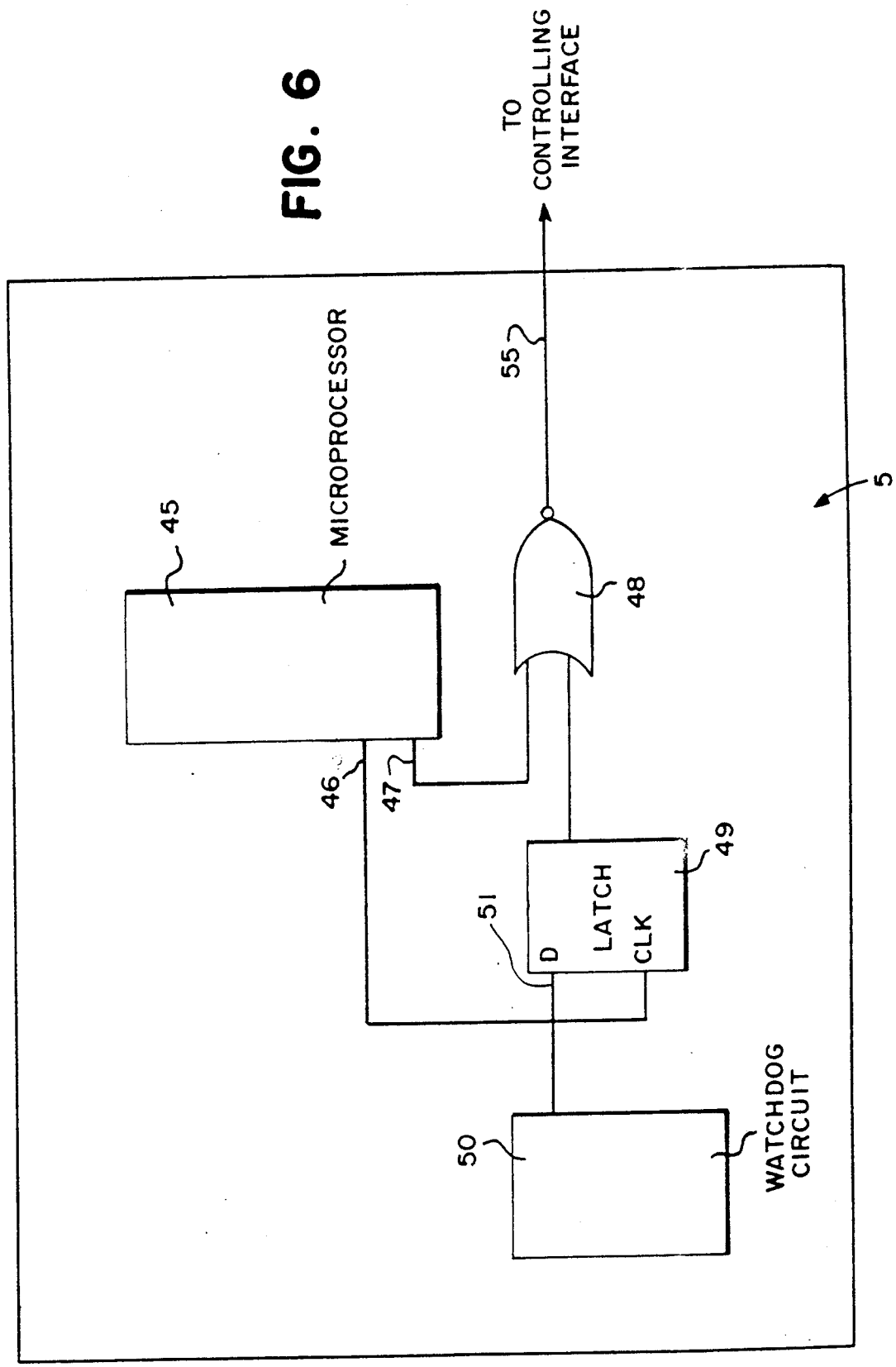
FIG. 6 is a schematic view showing improvements to the conventional supervised, derived channel unit which is used in conjunction with the alarm reporting system of the present invention.

To achieve this, an enhanced derived channel unit 5' is provided which incorporates additional means for monitoring these various occurrences, so that steps can be taken to activate the cellular radio transmitter 6 in the event of such failures and thereby notify the monitoring central station 10 of them. The majority of the derived channel unit 5' corresponds to the previously described derived channel unit 5. In addition, this otherwise conventional unit is provided with certain modifications which are described with reference to FIG. 6 of the drawings, and the discussion which follows. A derived channel unit 5' having such capabilities is also available from BT Telecom, Inc., under their Model No. 70586-501 or 70586-503.

The switched telephone line network 8 includes a scanner 40 (see FIG. 1) which is configured to address each derived channel unit to determine its current status. The scanner 40 conventionally incorporates means for polling a specified derived channel unit at given time intervals (e.g., every 120 seconds). If for some reason this polling signal is not acknowledged by the derived channel unit, the scanner 40 then resorts to a verification sequence in which polling signals are transmitted to the derived channel unit at a relatively rapid (i.e., salvo) rate for a specified period of time. However, while the scanner 40 is made aware of a potential compromise of the system, the derived channel unit 5 generally is not.

The derived channel unit 5' incorporates a microprocessor 45 which not only performs all of the functions of the derived channel unit 5, but which also operates to recognize polling signals from the scanner 40. This is accomplished by providing the microprocessor 45 with means (in software) for monitoring the time periods established by the scanner 40, and means for determining whether or not a scheduled polling signal has been received. These testing procedures are accomplished in addition to the processing steps which are performed, as previously, within the microprocessor 45 to process the signals which are received from the "watchdog" circuit 50 which also forms part of the derived channel unit 5' to monitor the integrity of the microprocessor 45. Also provided are means for testing the internal memory of the derived channel unit 5'. These two testing functions are output from the microprocessor 45, at 46 and 47, and are implemented using techniques which are themselves known.

The output 47 (i.e., the system testing functions such as detecting polling internals, time-outs and the integrity of the internal memory) forms a first input of a two-input NOR circuit 48. The second input of the two-input NOR circuit 48 is received from a latch 49 which receives clocking pulses from the output 46 (i.e., the watchdog testing function) of the microprocessor 45, and an input 51 from the watchdog circuit 50. The output 55 of the NOR circuit 48 constitutes the fault signal 11 which is applied to the controlling interface 7 to activate the radio transmitter 6 as previously described.

Similar techniques can be used to keep the derived channel unit 5' advised of discontinuities in communication between the scanner 40 and the monitoring central station 10. This is accomplished by determining whether or not the appropriate acknowledgment signals which are associated with the scanner 40 are established within specified time periods. For example, steps can be taken to determine whether the scanner acknowledgement signal is detected within a specified time period (e.g., within 45 seconds) following a detected alarm condition. Steps can also be taken to determine whether the appropriate acknowledgment signal is received from the monitoring central station within its specified time period (e.g., within 100 seconds). If either of these acknowledgements are not received within their specified time periods, the output 55 of NOR circuit 48 will operate to activate the cellular radio transmitter 6, advising the monitoring central station 10 of the detected alarm condition irrespective of the fault which may exist in the derived channel unit 5' or the switched telephone line network 8 extending between the subscriber's premises and the monitoring central station 10.

To be noted is that this latter functionality also has the effect of permitting the alarm reporting system 1 to be switched from the switched telephone line network 8 to the cellular radio transmitter 6 in cases where the switched telephone line network is "busy", or for some reason too slow to respond within a desired (e.g., with 100 seconds) time interval, or when noise on the switched telephone line network 8 is too great to provide effective communications. In either event, the cellular radio transmitter 6 is activated to effectively advise the monitoring central station 10 of the detected alarm condition.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A supervised, interactive alarm reporting system for providing communication between an alarm device associated with a premises and including means for controlling operations of said alarm device responsive to signals received from a plurality of sensors associated with said premises and means for dialing a selected number responsive to signals received from said controlling means, and a central facility for monitoring the alarm device at said premises, comprising:
   first means for establishing communication between the controlling means of said alarm device and said central facility using wired communicating lines;
   second means for establishing communication between the dialing means of said alarm device and said central facility using radio transmissions; and
   means connecting said first means and said second means for controlling operation of the first means and the second means according to the condition of at least said first means;
   wherein said connecting means is at all times connected for controlling operation of said first means and said second means according to the condition of at least said first means and independent of the state of said alarm device.

2. The system of claim 1 wherein said first means is a derived channel unit.

3. The system of claim 2 wherein said derived channel unit is supervised.

4. The system of claim 2 wherein said first means operates via a switched telephone line network.

5. The system of claim 1 wherein said second means is unsupervised.

6. The system of claim 5 wherein said second means is a transmitter only.

7. The system of claim 5 wherein said second means operates via a cellular telephone network.

8. The system of claim 1 wherein said first means is a derived channel unit and said second means is a radio transmitter, and wherein said connecting means operates to establish communication with said central facility using said derived channel unit during normal operating conditions.

9. The system of claim 8 wherein said communication is supervised by said central facility.

10. The system of claim 8 wherein said connecting means operates to establish communication with said central facility using said radio transmitter during a sensed alarm event.

11. The system of claim 8 wherein said derived channel unit includes means for determining a fault in communications with said central facility, and wherein said fault determining means operates to provide said connecting means with a fault signal.

12. The system of claim 11 wherein said connecting means causes said radio transmitter to operate responsive to said fault signal.

13. The system of claim 12 wherein said connecting means continues to operate said radio transmitter in the presence of said fault signal.

14. The system of claim 13 wherein said continued operation includes a radio transmission occurring responsive to a sensed alarm event.

15. The system of claim 13 wherein said continued operation includes a periodic radio transmission occurring responsive to a preselected timing sequence.

16. The system of claim 15 wherein said preselected timing sequence is variable in number of pulses and their frequency.

17. The system of claim 15 wherein said central facility includes means for searching for said periodic radio transmission responsive to the detection of a fault in said derived channel unit.

18. The system of claim 17 wherein said searching is accomplished by means for determining the coincidence of said periodic radio transmission and said preselected timing sequence.

19. The system of claim 12 wherein said derived channel unit includes means for resetting said connecting means upon cessation of said fault in communications with said central facility, returning said system to said normal operating conditions.

20. The system of claim 12 wherein an alarm event is detected if the central facility does not receive a signal from the radio transmitter following said detection of the fault signal.

21. The system of claim 11 wherein said fault determining means incorporates means for monitoring signals received from said central facility.

22. The system of claim 21 wherein said monitoring signals are acknowledgement signals received from said central facility following detection of an alarm event by said alarm device.

23. The system of claim 21 wherein said monitoring signals are polling signals received from said wired communicating lines at selected intervals.

24. The system of claim 11 wherein said fault determining means incorporates means for verifying operating functions of the derived channel unit.

25. The system of claim 24 wherein said derived channel unit includes memory means for performing desired memory functions, and wherein said verifying means operates to verify said memory functions.

26. The system of claim 8 wherein said radio transmitter is remotely tested.

27. The system of claim 26 wherein the periodic testing of said radio transmitter is responsive to periodic testing associated with said derived channel unit.

28. The system of claim 27 wherein said testing is performed from said central facility.

29. The system of claim 8 which further includes means for testing said alarm reporting system from said central facility.

30. The system of claim 29 wherein said derived channel unit is tested from said central facility.

31. The system of claim 29 wherein said radio transmitter is tested from said central facility.

32. The system of claim 1 wherein said central facility is fixed in location.

33. The system of claim 32 which further includes a mobile unit in communication with said alarm reporting system.

34. The system of claim 33 wherein said mobile unit is in communication with said central facility.

35. The system of claim 33 wherein said mobile unit is in communication with the second means of said alarm reporting system.

36. The system of claim 1 wherein said connecting means controls the operation of said first means and said second means at times other than an alarm event sensed by said alarm device.

37. The system of claim 36 wherein said other times are a fault detected by said alarm device.

38. The system of claim 1 wherein said alarm device is simultaneously connected with said first means and said second means.

39. The system of claim 1 wherein the wired communicating lines are wired telephone communicating lines.

40. The system of claim 39 wherein said selected number is a dialed telephone number.

41. The system of claim 1 wherein said first means establishes a direct communication between the controlling means of said alarm device and said central facility.

42. The system of claim 41 wherein said second means establishes a direct communication between the dialing means of said alarm device and said central facility.

43. A supervised, interactive alarm reporting system for providing communication between an alarm device associated with a premises and including means for controlling operations of said alarm device responsive to signals received from a plurality of sensors associated with said premises and means for dialing a selected number responsive to signals received from said controlling means, and a central facility for monitoring the alarm device at said premises, comprising:
first means for establishing communication between the controlling means of said alarm device and said central facility using wired communicating lines;
second means for establishing communication between the dialing means of said alarm device and said central facility using radio transmissions;
means connecting said first means and said second means for controlling operation of the first means and the second means according to the condition of at least said first means; and
means for reporting a sensed event associated with said premises to said central facility;
wherein said connecting means is at all times connected for controlling operation of said first means and said second means according to the condition of at least said first means and independent of the state of said alarm device; and
wherein said reporting means and said central facility are placed in communication by the first means or the second means according to said controlling operation of said connecting means.

44. The system of claim 43 wherein said first means is a supervised, derived channel unit.

45. The system of claim 44 wherein said second means is an unsupervised radio transmitter.

46. The system of claim 45 wherein said connecting means operates to establish communication with said central facility using said derived channel unit during normal operating conditions, and using said radio transmitter when a fault is sensed in connection with said derived channel unit.

47. The system of claim 46 wherein said reporting means operates responsive to an alarm event detected by said alarm device.

* * * * *